US007016712B2

(12) United States Patent
Newman et al.

(10) Patent No.: US 7,016,712 B2
(45) Date of Patent: Mar. 21, 2006

(54) HINGELESS MOBILE STATION

(75) Inventors: Rhys Newman, Woodland Hills, CA (US); Jim Holtorf, Thousand Oaks, CA (US); Nikolaj Bestle, Calabasas, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/232,281

(22) Filed: Aug. 30, 2002

(65) Prior Publication Data

US 2004/0203507 A1 Oct. 14, 2004

(51) Int. Cl.
*H04B 1/38* (2006.01)
(52) U.S. Cl. ............. 455/575.3; 455/90.3; 379/433.13; 16/221
(58) Field of Classification Search ............. 455/575.3, 455/575.1, 550.1, 90.3, 347–351; 379/433.13; 16/221–223, 229, 232, 250
See application file for complete search history.

(56) References Cited

U.S. PATENT DOCUMENTS 5,363,089 A * 11/1994 Goldenberg ............... 340/7.63
5,613,237 A * 3/1997 Bent et al. .................. 455/351

* cited by examiner

*Primary Examiner*—Lee Nguyen
(74) *Attorney, Agent, or Firm*—Alston & Bird LLP (57) ABSTRACT

A hingeless folding mobile station. The mobile station includes at least two halves that is separate enclosures each holding a portion of the mobile station's internal components. A flexible connector connects the components housed in one section of the enclosure with the internal components housed in the other. The two halves of the mobile station are held together by a retainer such as an elastomeric band that is stretched around the outer end of each section and around a series of return points located near the inner end of each the mobile station enclosure sections. A series of grooves or extensions are formed in various locations about the mobile station in order to retain the elastomeric band in place. When in place, the elastomeric band has been stretched from its normal resting length so that a tension force is constantly applied.

20 Claims, 9 Drawing Sheets

FIG. 1A

(PRIOR ART)

HINGELESS MOBILE STATION

The present invention relates generally to mobile-station design, and more specifically to a design for a hingeless folding mobile station that is secured by a retainer such as an elastomeric band, thus providing a unique, streamlined configuration and facilitating convenient interchangeability of components.

BACKGROUND OF THE INVENTION

Mobile telephone design is constantly evolving. Originally, mobile telephones were large and bulky, and necessarily so. The radio communications equipment inside them, and the battery for providing power both had to be carried in the same unit, although in earlier designs the unit was actually separated in two and connected by a power cable for operation. Advances in the technology related to both integrated circuitry and to electricity storage devices, however, have enabled mobile telephone designers to create smaller and smaller devices. These smaller instruments are not only lighter, but less cumbersome and easier to transport. For that reason, mobile telephones no longer need to be permanently installed in automobiles or connected to a separately-carried battery pack for convenient operation. If nothing else, small mobile telephones have simply become more fashionable.

Along with the convenience, however, have come certain drawbacks. While mobile phones that are almost miniature in comparison to their larger predecessors are certainly easier to carry, they are also easier to store or transport in a pocket, briefcase, purse, or duffle bag. They are subject to being stowed in glove compartments and toolboxes, and may frequently encounter other solid objects that could potentially cause damage to them, either cosmetic or to their actual internal components. Despite this frequent rough handling, the mobile phones' small lightweight construction obviously makes it more difficult to use heavy-duty structural components to protect increasingly sensitive equipment. Modern mobile phones are in some ways simply more vulnerable to injury.

The risk of damage is exacerbated by the number of externally accessible components. Most prominently, mobile telephones now almost universally have some form of visual display. Initially, visual indicators might have been limited to small, light emitting diodes (LEDs) that indicated whether the telephone was on or a call was in progress. More advanced LED displays were then developed that were capable of displaying a dialed telephone number, the current time, or other simple information. More recently, liquid crystal displays (LCDs) have become common. An LCD is made by sandwiching an electrically sensitive liquid-crystal material in between two very thin pieces of glass or other transparent material. They are, therefore, easily susceptible to damage by even relatively minor impact. Although normally protected by a hard, transparent cover or similar protective mechanism, LCDs are still nonetheless easily damaged components in the modern mobile telephone. Although other externally-accessible components are not so easily harmed, they are nevertheless subject to damage caused by rough handling.

One solution providing more protection for the mobile phones externally-accessible components is the bifold design. A bifold mobile telephone is one that may be, generally speaking, folded in half. That is, the instrument is typically made up of at least two parts that are electrically connected together, each part housing a portion of the mobile telephones internal components. Note that herein the term "folded in half" is used in a general sense, that is, the two "halves" are not necessarily equal in size. There may even be more than two "halves" although such a design is not typical. In ordinary use, the two halves are held together by a hinge, and "opened" when the phone is actually being used to place or receive a call. Opening the phone reveals its LCD and keypad, which remain folded inside when the unit is closed for storage. Using this design, the mobile telephone may be more safely tucked into a pocket or purse, or clipped onto the user's belt, its most impact-sensitive exposed components now protected by the hard plastic case.

Figure 1A:
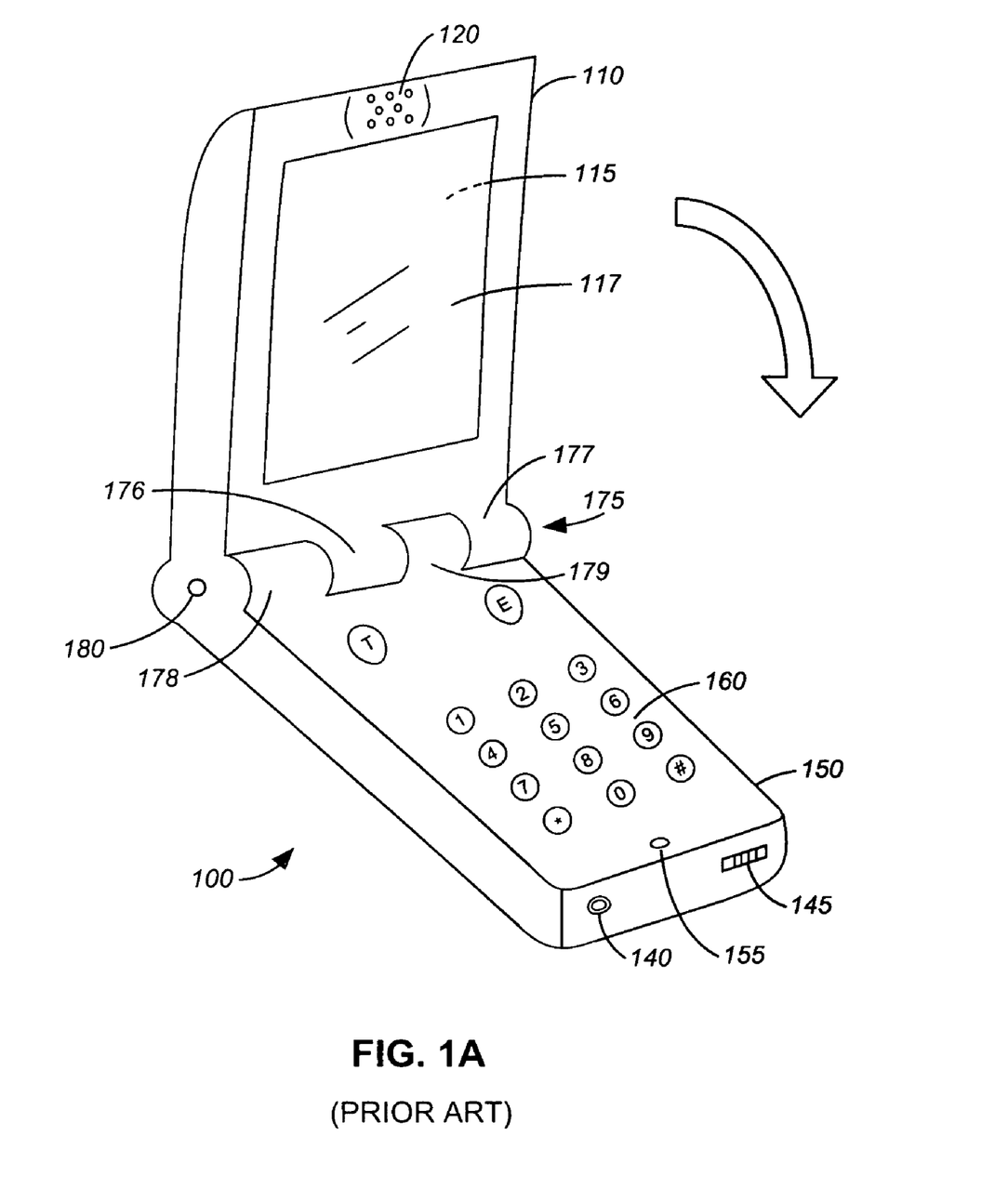

FIG. 1 is an illustration of a typical bifold mobile telephone according to the prior art. Mobile telephone 100 includes a first portion 110 and a second portion 150. First portion 110 of mobile phone 100 houses the LCD 115, visible through but protected by clear plastic cover 117. Speaker port 120, a series of small openings formed in first portion 110, lie adjacent to an internal speaker (not shown) that is also housed by first portion 110. First portion 110 of mobile phone 100 also typically includes the circuitry for driving the display 115 and the internal speaker.

Second portion 150 of mobile phone 100 includes a microphone port 155 formed in second portion 150 adjacent to an internal microphone (not shown). Second portion 150 also forms a plurality of openings through which the individual keys of an otherwise internally disposed key mat, form keypad 160. As with first portion 110, second portion 150 of mobile telephone 100 also houses the internal circuitry associated with these user interface devices. An antenna for facilitating radio frequency (RF) communications may be located in either first portion 110 or second portion 150, or may be distributed between them. The battery (not shown) of mobile telephone 100 is typically stored in the second portion 150, the first portion 110 being taken up largely by the LCD and speaker. An external power supply (not shown), such as an AC adaptor, may be connected through power port 140. Similarly, external headphones (not shown) may be connected to mobile phone 100 at external-device port 145.

Figure 1B:
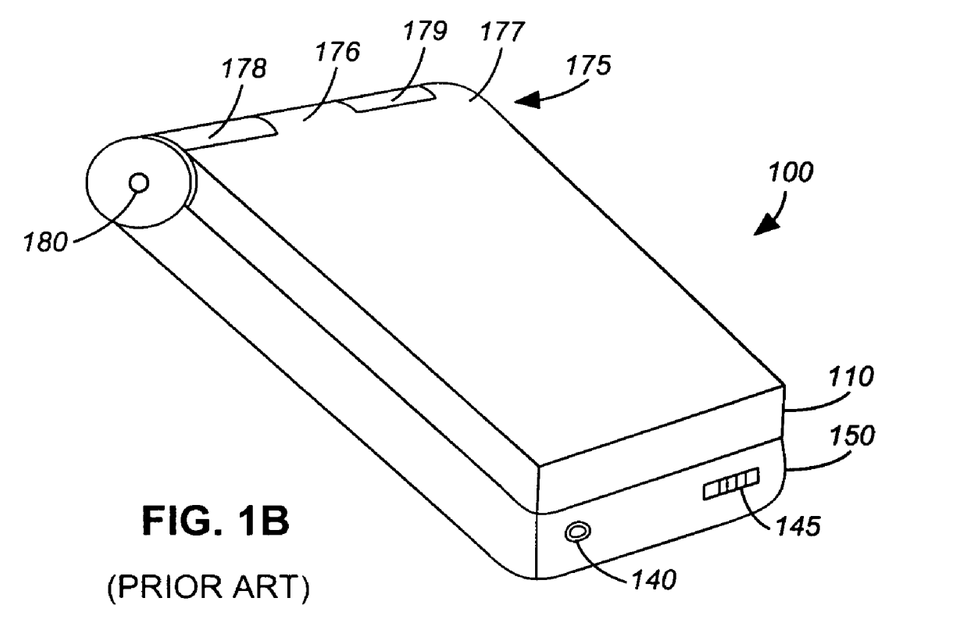

The two sections of mobile phone 100 are held together by a hinge 175. Forming hinge 175 are hinge members 176 and 177 extending from first portion 110 and hinge members 178 and 179 extending from second portion 150. The two sections are then held together by hinge pin 180, which extends through openings formed in hinge members 176 through 179. Note that as shown in FIG. 1, mobile phone 100 is in its active operational position. When the mobile phone is thus "opened", the user has access to the keypad and can conveniently place the speaker port and microphone port in a position for voice communication. The mobile phone 100 may also be "closed" by folding the first portion to meet the second portion in the direction of the arrow. FIG. 1B is an illustration of mobile phone 100 in the closed position. Note that the first portion 110 and the second portion 150 close in such a manner as to protect the keypad and more importantly the LCD 115. Generally speaking, the mobile telephone 100 cannot be used in this configuration, although it may be possible to do so by employing an external microphone and speaker (not shown). The external microphone and speaker are often used for 'hands-free' operation, and may be connected through external-device port 145. A phone thus equipped could be placed into a pocket while a call was in progress, at least until access to the keypad requires that it be opened up. As alluded to above, when in the closed position, mobile phone 100 may be placed into a belt clip device, pocket, purse, or glove compartment without fear of it being damaged by objects such as keys that it might encounter there.

As should by now be apparent, folding mobile telephones have features that are both useful and desirable. Some users may also prefer them to other designs from a purely-aesthetic point of view. The design shown in FIGS. 1A and 1B is not optimum, however, as the hinge mechanism in some cases hinders the ability of designers to make stylish modifications. The hinge also represents somewhat of a bulky addition to the otherwise compact and streamlined telephone, and must be relatively sturdy in order to avoid damage to some of its more vulnerable components, such as hinge members 176 through 179 (shown for example in FIG. 1A). It would therefore be desirable to construct a folding mobile telephone having the advantageous features of the typical mobile telephone 100 shown in FIG. 1, but without the disadvantages associated with its hinge member 175. The present invention provides just such a design.

SUMMARY OF THE INVENTION

The present invention is directed to a novel design for a folding mobile telephone or similar electronic device. In one aspect, the present invention includes a plurality of mobile-station enclosure sections, the sections collectively housing the components necessary for mobile station operation. A first section and a second section are, when the mobile station is assembled, retained in an adjustable relationship by a retainer. The retainer includes an elastomeric portion that is stretched beyond its resting state when assembled with the enclosure sections and held in place so that the enclosure sections are maintained in a relationship adjacent to each other but can be operably adjusted between an open and a closed configuration. The retainer may be entirely made of an elastomeric material, or may include non-elastomeric material, or may include non-elastomeric portions connected to the elastomeric portion. The retainer may be a band held in place by grooves or other openings formed in the enclosure sections. The retainer may also include a hood or net to capture the end of an enclosure section and thereby help hold the retainer in place. A mobile station may have interchangeable components so that, for example, different enclosure sections may be paired together to change the mobile station's functionality, or different retainers may be used to customize the appearance of the mobile station.

BRIEF DESCRIPTION OF THE DRAWINGS

For a more complete understanding of the present invention, and the advantages thereof, reference is made to the following drawings in the detailed description below:

FIGS. 1A and 1B are isometric views of typical folding mobile phone according to the prior art; FIG. 1 shows the phone in an open configuration, FIG. 1A shows the phone in a closed configuration.

DETAILED DESCRIPTION

FIGS. 2–6B discussed below, and the various embodiments used to describe the present invention are by way of illustration only, and should not be construed to limit the scope of the invention. Those skilled in the art will understand the principles of the present invention may be implemented in a variety of other electronic and communications devices, in addition to the devices specifically discussed herein. For example, the present invention will be presented in the context of a cellular mobile telephone, but is equally applicable to any number of similar devices, including without restriction personal digital assistants (PDAs), hand-held personal computers (PCs), organizers, and even portable televisions of the proper design. In fact, many such devices are being enhanced by adding functions traditionally associated with one of the others. For this reason, these and similar devices will be referred to herein as "mobile stations". The present invention is advantageously applied to any mobile station that uses the folding concept.

The present invention is directed to a hingeless mobile station. The term hingeless refers to the lack of a captured hinge pin, such as the one rotatably connecting the two enclosures sections of mobile phone 100 shown in FIG. 1. A design avoiding this hinge structure can be aesthetically attractive and more streamlined in shape, especially when closed. The hingeless design also makes it easier for the two sections of a folding mobile station enclosure to be physically separated when it is necessary or desirable to do so.

Figure 2:
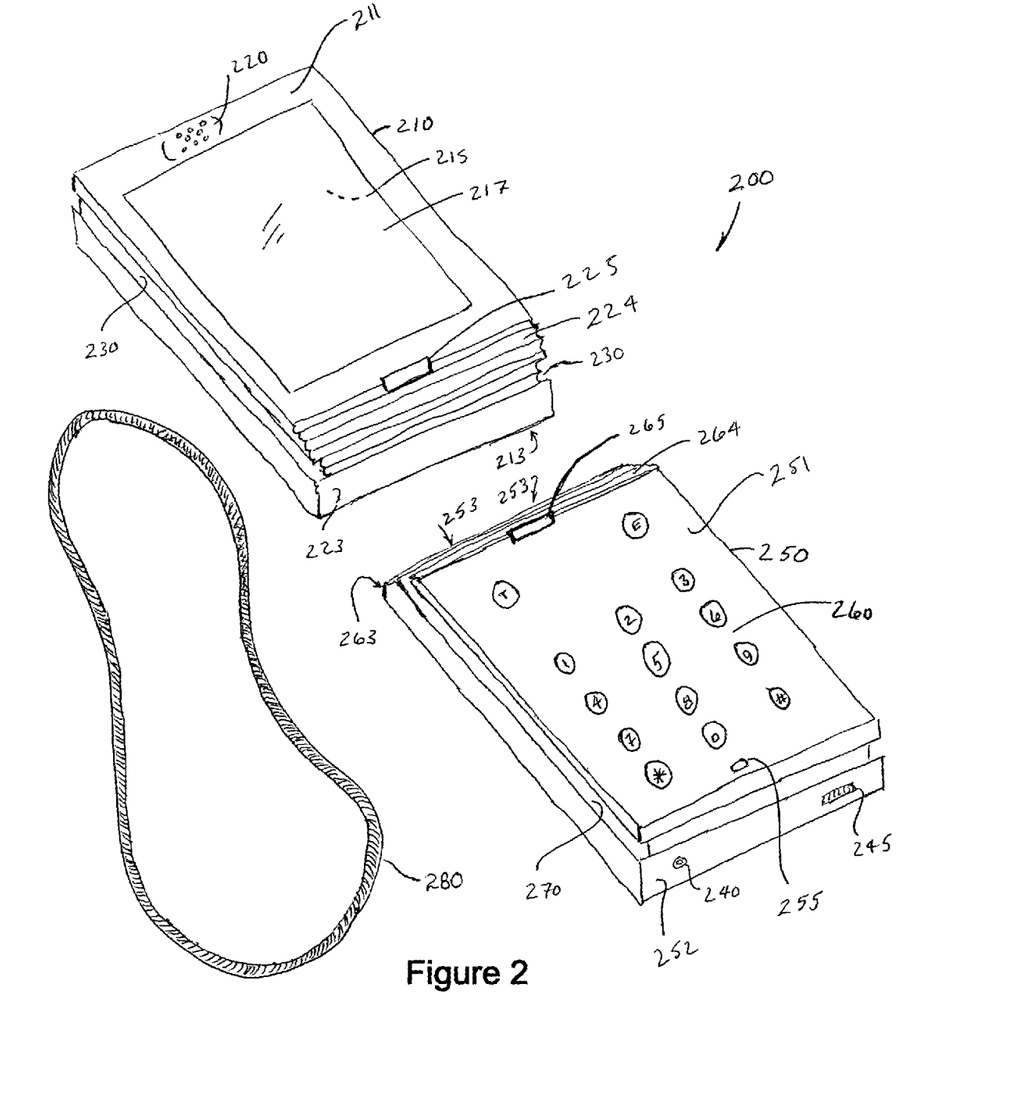
FIG. 2 is an exploded isometric view of a mobile station according to one embodiment of the present invention.

FIG. 2 is an exploded isometric view of a mobile station 200 according to an embodiment of the present invention. Excepting the hingeless feature of the present invention, the basic design and function of mobile station 200 is similar to that of the mobile phone 100 of FIG. 1. For this reason, analogous components will be analogously though not identically numbered. In the illustrated embodiment, mobile station 200 has a first enclosure section 210 and a second enclosure section 250, together these two components substantially enclose the internal components associated with operation of the mobile station.

For convenience in describing this embodiment of the present invention, the first enclosure section 210 will sometimes alternately be referred to as the "upper" section and the second enclosure section 250 housing the keypad 260 will correspondingly be sometimes alternately referred to as the "lower" section. This convention is for purposes of describing the illustrated embodiments only; there is no requirement that a device embodying the present invention have one section that in normal operation is higher than the other. Nor is it required that a section contain any component in particular. In fact, it is possible that in some embodiments there will be no components in one of the sections, or at least none having to do with mobile-station operation. (In this case, the convenient term "enclosure" may nevertheless be used to refer to the empty or otherwise employed section.) And while there are generally two enclosure sections in folding electronic devices, there could be more, such as a separate battery or memory module. Of course, there must be at least two for the advantages of the present invention to obtain.

Returning to the embodiment of FIG. 2, upper section 210 has a face 211 that forms an opening through which LCD 215 is visible behind transparent cover 217. Also enclosed in upper section 210 is a speaker (not shown) positioned interiorly adjacent to speaker port 220. Lower section 250 has a face 251 that forms a plurality of openings for the keypad 260 user interface, which here is shown to include a "talk", "end", and alphanumeric entry keys. Also visible on face 251 is microphone port 255. Power port 240, for connecting an exterior power source, is visible through an opening formed in outer end 252 of lower section 250, as is external-device connector port 245. Outer end 252 is so labeled herein because it lies on the outside of assembled mobile station 200 when it is in the open configuration (see, for example, FIG. 3A.) Inner end 253, in contrast, will be in contact with inner end 213 of upper section 210.

More specifically, in this embodiment inner end 213 of upper enclosure section 210 includes an abutting surface 223 and a rotating surface 224. When the mobile station 200 is in its fully-open configuration, abutting surface 223 will be in contact with abutting surface 263 of lower enclosure section 250. These surfaces are shown here to be flat, but could have another topography as well, as long as when mated with each other the mobile station is able to remain in a stable open condition. The abutting surfaces are shown here to be perpendicular to the faces of each section, meaning that in a stable open condition, the planes of face 211 and face 251 will be parallel. In an alternate embodiment, the orientation angle of one or both abutting surfaces may be other than perpendicular to the face, with the open configuration of the mobile station varying accordingly.

In the embodiment of FIG. 2, inner end 213 also includes a curved rotating surface 224, corresponding to curved rotating surface 264 of inner end 253. As the mobile station is opened and closed, the line of contact between upper enclosure section 210 and lower enclosure section 250 moves along these rotating surfaces. Note that the curved surfaces are not required to have any particular shape, and could instead even be a series of flat steps. The curved rotating surfaces shown here have a series of corresponding ridges (similar to the cogs of a gear) that mesh peek-to-valley as the mobile station opens and closes to prevent (or reduce the risk of) slippage. For convenience this type of surface will be called a geared surface. The ridges of the geared surface need not be straight or continuous, of course, as long as the two surfaces can properly correspond. In an alternate embodiment, the rotating surfaces are covered with a skid-resisting material to achieve the same objective.

In this embodiment, there are internal components of mobile station 200 housed in both enclosure sections and they will be connected by a physical connector (not shown in FIG. 2) that runs from the interior of one section to the interior of the other. Openings 225 and 265, formed in upper section 210 and lower section 260, respectively, provide access to the interior for this connector. These openings are preferably placed near one another so that a relatively shorter conductor may be used, and so that in operation it is unobtrusive. There is no requirement that they be so located, however, or that they are similarly located on each section. The physical connector may be a flexible conductor, or more likely a series of flexible conductors or a flexible circuit, one that flexes to permit the opening and closing of the folding mobile station while maintaining the electrical connection between appropriate components of the mobile station. The design of a mobile station 200 according to the present invention is not limited to these connectors, however, and alternative designs are possible. For example, one or more contact surfaces may be provided, a contact surface on the upper section corresponding to a contact surface on the lower section so as to meet in any configuration in which electrical contact is required. While this may be desirable in some designs, it is considered generally less reliable and therefore is not preferred. In another alternative embodiment, there is no physical electrical connection between the upper housing portion and the lower housing portion, but instead both sides are provided with a complete set of components that can perform their respective functions. In some cases, this may actually require wireless communication between the two portions. For example, using infrared or a short-range radio frequency communication system such as Bluetooth or IEEE 802.11b.

Returning to the embodiment of FIG. 2, the conductor (not shown) between the upper and lower enclosure portions may be permanently attached, or may be removably attached to either or both of the two sections so that the sections may be completely separated from each other. There may be embodiments of the present invention where such a feature would be useful. For example, enclosure sections (and their internal components) may be interchangeable with other such sections containing different components and providing different functionality (or simply a different appearance). A mobile phase, for example, could be converted into a mobile gaming station in this way.

In accordance with the present invention, the two separate sections, when assembled, are held together using a retainer means. In FIG. 2, this retainer is elastomeric band 280. An elastomer is a material that may be significantly deformed from its normal or resting state, without plastic deformation or failure, but while so deformed has the tendency to return to its resting state. In assembling the mobile station 200 of FIG. 2, the elastomeric band 280 is elastically deformed and creates a tension force that holds or retains the two separate halves together. In the embodiment of FIG. 2, elastomeric band 280 is received into groove 230 formed in the upper enclosure portion and groove 270 formed in the lower enclosure portion. The grooves help to retain the elastomeric band in place while the mobile station is in use and during the opening and closing operations. In the embodiment of FIG. 2, the grooves extend around the perimeter of their respective enclosure sections except for the inner-end (where it is unnecessary). The perimeter groove not only retains the band 280 but also keeps it partially or completely away from the user's hand. This reduces the risk that it will be interfered with inadvertently. There is no requirement that this particular design is used, however, as long as the band 280 can be retained successfully.

Figure 3A:
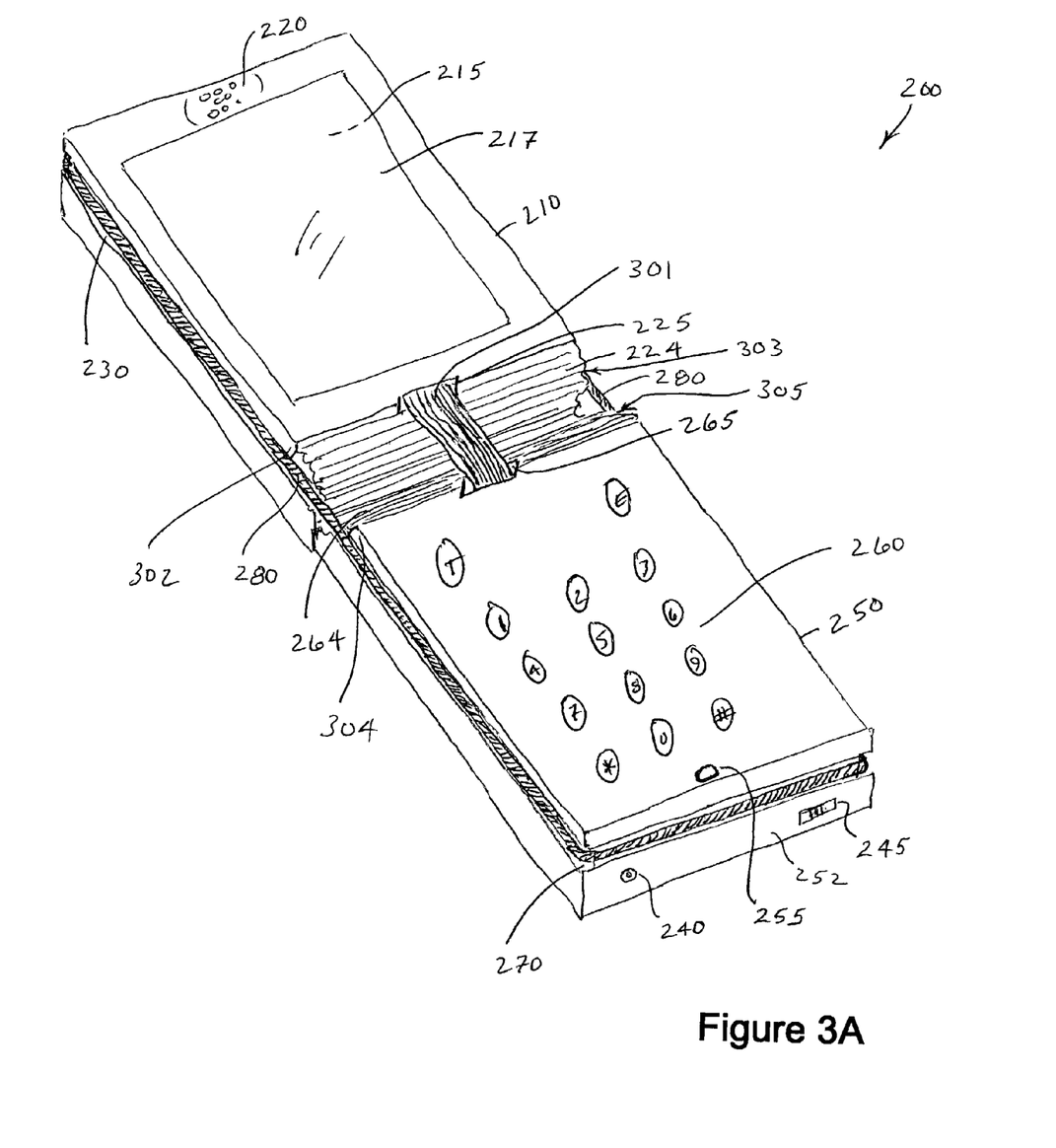
FIGS. 3A–3C are isometric views of the mobile station of FIG. 2, showing the station in an open, partially open, and closed configuration, respectively.
Figure 3B:
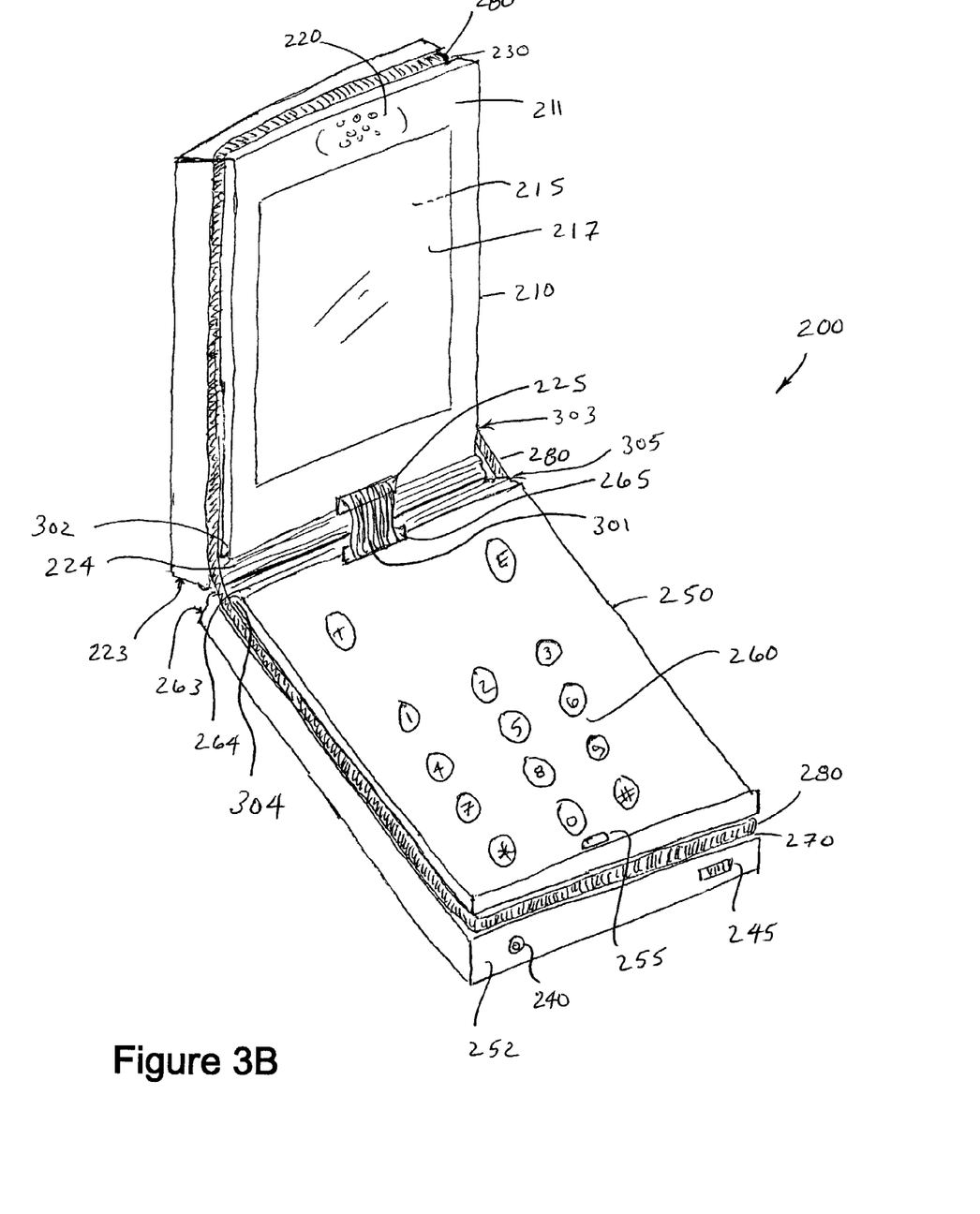
Figure 3C:
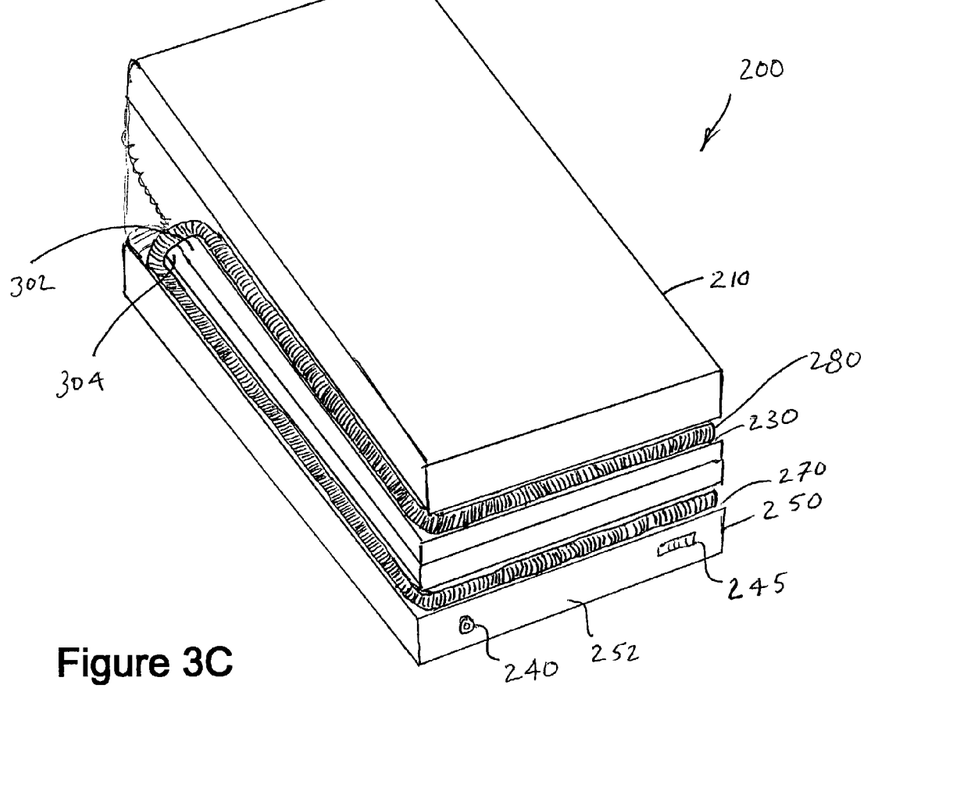

FIGS. 3A through 3C are isometric views of the mobile phone at mobile station 200 of FIG. 2 shown in assembled condition according to an embodiment of the present invention. FIG. 3A shows the mobile station 200 in the fully opened configuration, FIG. 3B shows it in an intermediate or partially opened configuration, and FIG. 3C shows it in a closed configuration. As can be seen in FIGS. 3A–3C, the mobile station 200 is similar in appearance to the typical folding mobile station 100 as shown in FIGS. 1A and 1B, and described above. In this hingeless design, however, upper enclosure section 210 and lower enclosure section 250 are held together by the tension exerted by the elastomeric band 280. As mentioned above, where the elastomeric band is disposed within the groove formed in each of the respective enclosure sections, it remains unobstrusive.

Also visible in FIG. 3A is flexible connector 301, which provides the electrical connection between (the components in) upper enclosure section 210 and lower enclosure section 250. Flexible connector 301 may also have structural advantages as well, one of which may be preventing the two enclosure sections from rotating past the fully opened position. Naturally, where flexible connector 301 is used in this fashion, it must be adequately secured to avoid damage to the various internal electrical components. In the embodiment of FIG. 3A, flexible connector 301 simply enters each housing at openings 225 and 265, respectively, but alternately could be equipped with a plug on one or both ends assuming a corresponding receptacle is also provided. In embodiments where the complete physical separation of the two enclosure sections is desired, some convenient way of disconnecting the flexible connector 301 from one or both halves will, of course, need to be provided.

The left side of mobile station 200 is visible in FIG. 3A. There, it can be seen that the elastomeric band 280 in a state of tension retains the two enclosure halves together in an operational configuration. As such, it must extend from the groove 270 formed in lower enclosure section 250 to groove 230 of upper enclosure section 210. In the area proximate inner ends 213 and 254, however, the band 280 simply extends between the two halves and is not contained in any groove. The point where the band 280 leaves the groove will be called a return point, numbered in FIG. 3A as 302, 303, 304, and 305. The significance of these return points will now be explained.

FIG. 3B shows the mobile station 200 in a partially opened configuration. Abutting ends 223 and 263 are no longer in contact, the inner ends 253 and 213 are now contacting each other on the curved rotational surfaces 224 and 264, respectively. Flexible connector 301 is either taken up into one or both of the openings formed in the enclosure sections, or some other provision is made so that it does not interfere with the closing operation. The tension of elastomeric band 280 continues to hold the two enclosure sections together because it remains stretched about return points 302 through 305. Note that each return point does not have to be located at the inner end of the respective enclosure section, however, each return point must be located so that the elastomeric band 280 will not be allowed to return to its relaxed length. Note that in some designs, it may be possible to allow the retaining means to completely relax because reconfiguring the mobile station from that point requires an applied force. Not allowing the retainer to "completely relax" refers to maintaining some tension force (or "stretch") unless the mobile station is in a configuration from which it cannot undesirably move without encountering resistance from the retainer. Note also that in most embodiments, the mobile station 200 will not be stable in the partially-opened configuration of FIG. 3B. Rather, the tension exerted by elastomeric band 280 will tend to move it in the fully opened or the closed position, depending on the current angle of rotation between the two enclosure sections. The angle at which movement in either direction will determine whether the mobiles station "snaps open" or "snaps closed" may be referred to as the "flip point". Finally, in FIG. 3A, the mobile station 200 is shown in a closed position. (For simplicity, the mobile station 200 will be said to be either closed, partially open, or fully open.) Note in FIG. 3C that the elastomeric band remains stretched about return points 302 and 304, visible on the left side of the closed mobile station 200. (Return points 303 and 305 are not fully shown in this view, but hold band 280 in a similar fashion.) Note that locating the return points away from the very (inner) ends of the mobile station enclosures helps to prevent its inadvertent opening. This design feature may be referred to as an "over center" design, and prevents the flip point from being an angle very close to the closed configuration—avoiding accidental opening of the mobile station. In this configuration the mobile station may be safely placed in a pocket or purse. In this embodiment, elastomeric band 280 remains in grooves 230 and 270 and relatively unobtrusive.

Figure 4A:
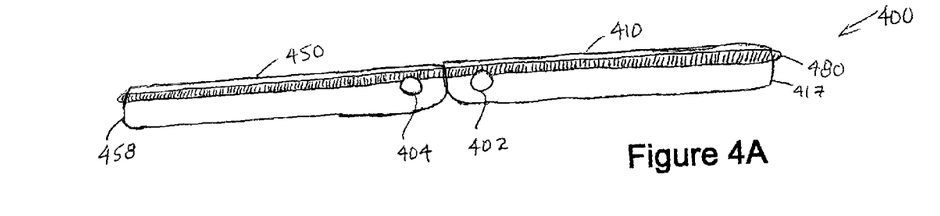
FIGS. 4A–4C are simplified sketches of a mobile station according to one embodiment of the present invention, shown in an open, partially open, and closed configuration, respectively.
Figures 4B, 4C:
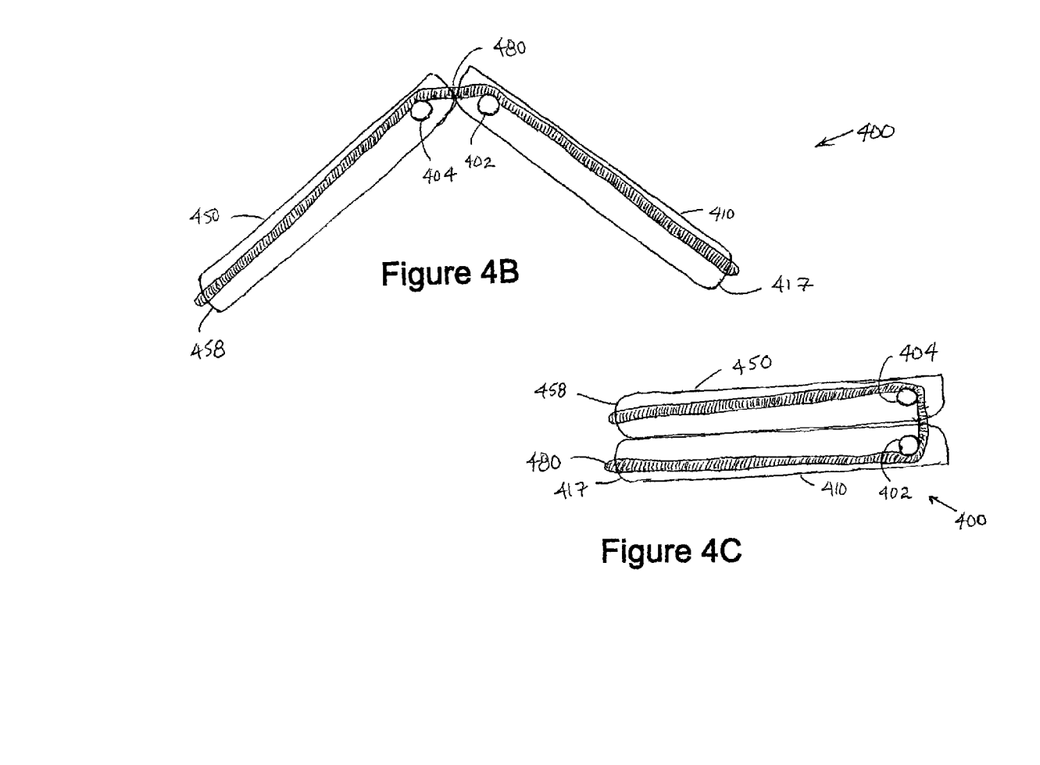

FIGS. 4A–4C are simplified sketches of mobile station 400 to more clearly illustrate the operation of the hingeless mobile station. Mobile station 400 includes section 410 and section 450 and is held together by an elastomeric band 480. Return points 402 and 404 are in this embodiment extensions of sections 410 and 450, respectively. Return points are preferably also present on the other side not shown of mobile station 400 in substantially the same configuration. In FIG. 4A, mobile station 400 is in the fully opened configuration, in FIG. 4B, it is partially opened, and in FIG. 4C, it is closed.

Figure 6A:
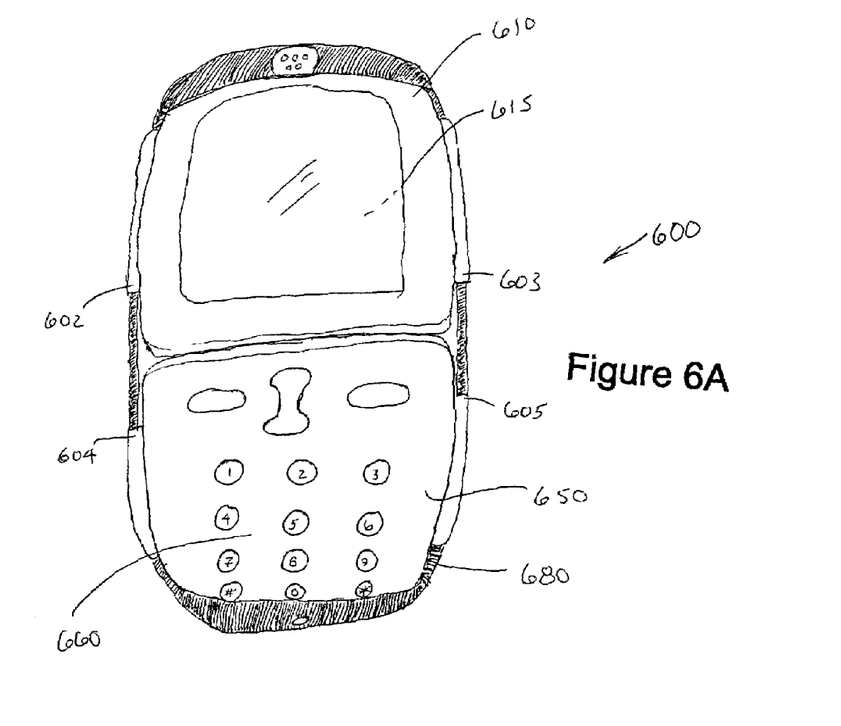
FIGS. 6A and 6B are illustrations of a mobile station, shown in the open and closed configuration, respectively, according to another embodiment of the present invention.
Figure 6B:
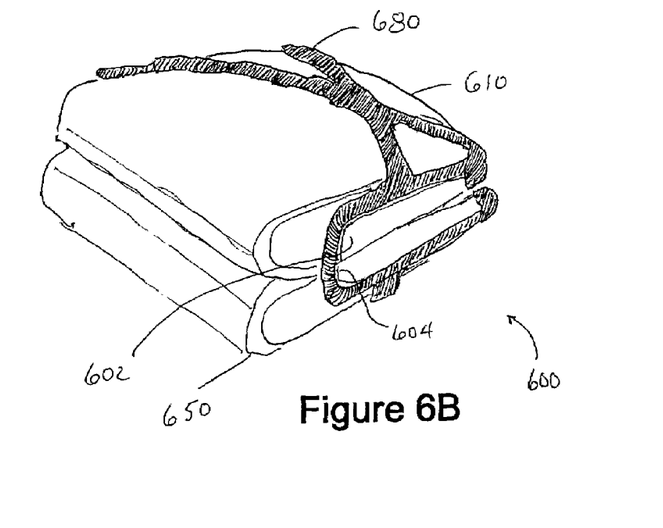

Note that there is no means provided for retaining the elastomeric band at the outer ends 418 and 458 of the mobile station halves. This is not a preferred embodiment, but illustrates that no retaining means are necessary. The grooves of mobile station 200 (shown in FIGS. 2 through 3C) form not only return points, but also an outer-end retaining means to hold band 280 in place. In alternate embodiments, the outer-end retaining means could also be in the form of a cap, clip, or clamp, or similar device (not shown) that would prevent the elastomeric band 480 from slipping off of the end of the mobile station. A groove formed (only) in the corners of each mobile section half would provide a similar effect to the perimeter groove of mobile station 200. Instead of (or addition to) a groove, in extension or series of extensions could be formed in mobile station halves 410 and 450 to achieve the same purpose period. (FIGS. 6A and 6B show how the retainer can be designed to help hold it in place.)

Figure 5A:
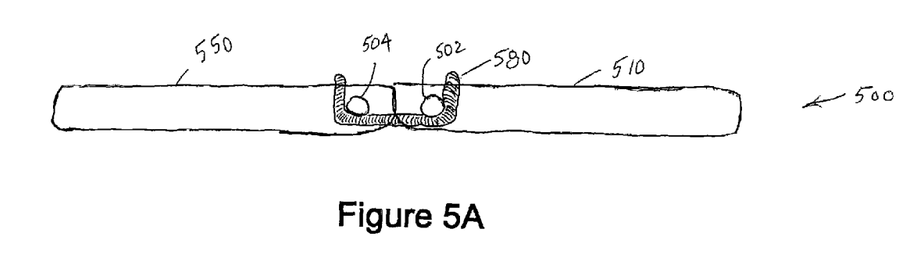
FIGS. 5A–5C are simplified sketches of a mobile station according to another embodiment of the present invention, shown in an open, partially open, and closed configuration, respectively.
Figure 5B:
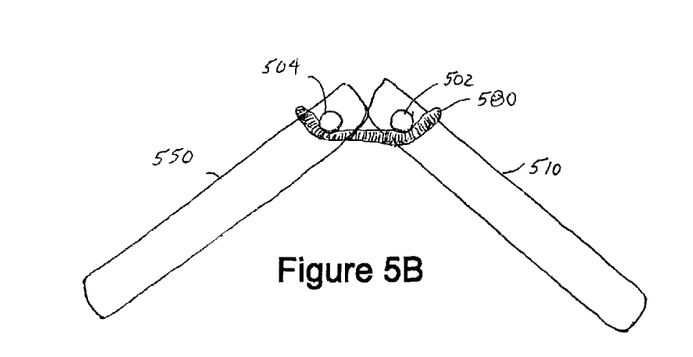
Figure 5C:
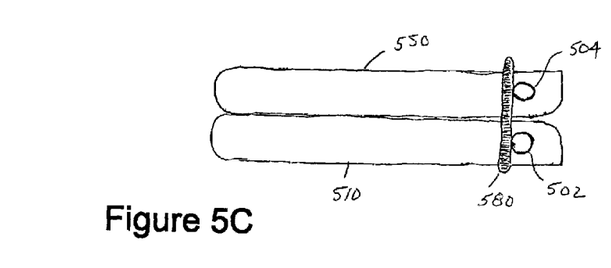

FIGS. 5A through 5C are simplified sketches to illustrate another embodiment of the present invention. Mobile station 500 includes two halves 510 and 550 retained together by elastomeric band 580. Much shorter than elastomeric band 480, elastomeric band 580 is simply placed around both sections of the mobile station in a closed position (FIG. 5C) as the mobile station is opened, the elastomeric band 580 continues to hold the two halves together as it is stretched about returned points 502 and 504 (and corresponding return points (not shown) on the other side). In the fully opened position (FIG. 5A) the tension created in the elastomeric band 580 continues to hold to the two halves of the phone together. And also in this embodiment any number of grooves or extensions could be provided in order to more surely retain the elastomeric band in place. FIGS. 6A and 6B are views of a mobile station 600 according to yet another embodiment of the present invention. The components illustrated for reference on mobile station 600 are LCD 615 of first enclosure section 610 and keypad 660 on second enclosure section 650. Note that in this embodiment, rather than forming an extension or groove at the outer end of mobile station 600, retainer 680 is instead modified to include a net so that is retained on the mobile station 600 throughout operation. Instead of a net, a solid hood may be used, the distinction between the two being considered not material to the present invention. In either case, a hollow is formed to receive and capture the outer end of a mobile station enclosure section to aid in holding the retainer 680 in place. The net (or hood) may or may not itself be elastomeric, although some portion of the retainer 680 will have to possess elastomeric quantities. The return points 602–604 are provided by structural extensions formed in the sides of each of the enclosure sections.

Note that the retaining means in this case need not be made entirely of elastomeric material. The net or hood portion for example need not be an elastomer so long as the elastomeric properties of the connecting member are sufficient to supply the required tension. Finally, note that the elastomeric retaining means need not be symmetrical.

As mentioned above, the upper and lower enclosure sections of the mobile station may be completely separable, and a user may take them apart in ordinary operations simply by removing the elastomeric retaining means and, if necessary, disconnecting the conductor. In this way, upper and lower portions may be interchanged with other compatible components. Such an option would allow for the interchange, for example, of a game keypad, in replacement of the typical mobile telephone keypad that will ordinarily be found on many such devices. In addition, the interchanged retaining portion may also simply provide extra battery power, extra memory storage, extra computing power, and so forth. In one particularly preferred embodiment, the upper portion of mobile station has a display screen that may be used in conjunction either with the mobile telephone keypad, or with a television control keypad. The lower section having the television control keypad would obviously need to contain any necessary components that are already included in the upper enclosure section in order to make the television operable.

The preferred descriptions are of preferred examples for implementing the invention, and the scope of the invention should not necessarily be limited by this description. The scope of the present invention is defined by the following claims.

What is claimed is:

1. A mobile station, comprising:
   a first enclosure enclosing a first set of mobile-station components and having at least one first return point and a substantially curved rotating first contact surface;
   a second enclosure enclosing a second set of mobile-station components and having at least one second return point corresponding to said at least one first return point, and having a substantially curved rotating second contact surface configured for engaging said first surface substantially without slippage, wherein the first contact surface comprises a surface having sufficient friction such that when brought into contact with the second contact surface, sliding of the two surfaces with respect to the other is substantially precluded;
   a conductor electrically connected to the first set of mobile station components and to the second set of mobile-station components;
   an elastomeric retainer connected between said at least one first return point and said at least one second return point for urging said first surface to said second surface substantially without slippage and for substantially simultaneously facilitating rotation of said first surface about said second surface for positioning said first enclosure with respect to said second enclosure in at least three configurations including at least one of a closed position, a partially open position, and an open position, and wherein said first and second return points are positioned on said respective first enclosure and second enclosure such that space between said first and second return points is less when said first and second enclosures are configured in one of said open position or said closed position than in said partially open position; and
   wherein the first set of components and the second set of components cooperate with each other to form an operational mobile station.

2. The mobile station of claim 1, wherein the retainer is an elastomeric band.

3. The mobile station of claim 1, wherein the retainer is an elastomeric retainer comprising a net configured for fitting over at least one of the first enclosure and the second enclosure.

4. The mobile station of claim 1, wherein the retainer is an elastomeric retainer comprising a hood configured for fitting over at least one of the first enclosure and the second enclosure.

5. The mobile station of claim 1, wherein the retainer is an elastomeric retainer comprising a non-elastomeric portion.

6. The mobile station of claim 1, wherein the retainer comprises a plurality of non-elastomeric portions interconnected by elastomeric portions.

7. The mobile station of claim 1, wherein the first contact surface and the second contact surface each comprise a plurality of latitudinal extending exteriors that cooperate with each other for facilitating engagement of said first surface with said second surface substantially without slippage.

8. The mobile station of claim 1, wherein said first return point comprises at least one extension of said first enclosure, and said second return point comprises at least one extension of said second enclosure.

9. An enclosure for a mobile station, comprising:
   a first enclosure section having a substantially curved rotating first contact surface;
   a second enclosure section having a substantially curved rotating second contact surface configured for engaging said first surface substantially without slippage;
   a elastomeric retainer having an elastomeric portion connected between said first enclosure and said second enclosure for urging together said first surface to said second surface substantially without slippage and for substantially simultaneously facilitating rotation of said first surface about said second surface; and
   wherein said rotation of said first surface about said second surface facilitates for said first and second enclosures at least three configurations including at least one of a closed position, a partially open position, and an open position, and wherein said first enclosure further comprises at least one first return point, said second enclosure further comprises at least one second return point corresponding to said at least one first return point, and said retainer is an elastomeric retainer stretched between said first and second return points, said first and second return points being positioned on said respective first and second enclosures such that space between said first and second return points is less when said first and second enclosures are configured in one of said open position or said closed position than in said partially open position.

10. The enclosure for a mobile station of claim 9, wherein the second enclosure section is completely separable from the first enclosure section and the retainer.

11. The enclosure for a mobile station of claim 9, further comprising internal components of the mobile station operably enclosed by and secured within the first enclosure section and the second enclosure section for constituting a functional mobile station.

12. The enclosure for a mobile station of claim 9, further comprising:
   first internal components of the mobile station operably enclosed by and secured within the first enclosure section;
   second internal components of the mobile station operably enclosed by and secured within the second enclosure section; and
   a conductor electrically connecting said first internal components enclosed by the first enclosure section to said second internal components enclosed by the second enclosure section to thereby constitute a functional mobile station.

13. The enclosure for a mobile station of claim 12, wherein the conductor comprises a plurality of individual conductors.

14. The enclosure for a mobile station of claim 12, wherein the conductor comprises a flexible circuit.

15. The enclosure for a mobile station of claim 12, wherein the conductor is configured to structurally resist movement of the first enclosure section relative to the second enclosure.

16. The enclosure for a mobile station of claim 9, wherein the retainer is an elastromeric band.

17. The enclosure for a mobile station of claim 9, wherein the retainer comprises a retaining structure configured for capturing a portion of the mobile station, thereby tending to secure the retainer to the mobile station.

18. The enclosure for a mobile station of claim 17, wherein the retaining structure is a hood.

19. The enclosure for a mobile station of claim 9, wherein the first surface is a first geared surface, and wherein the second surface is a second geared surface that cooperates with the first geared surface when the mobile station is adjusted between a closed and an open configuration.

20. The enclosure for a mobile station of claim 9, wherein said first return point comprises at least one extension of said first enclosure section, and said second return point comprises at least one extension of said second enclosure section.

* * * * *